United States Patent [19]
Yamamoto

[11] 3,707,779
[45] Jan. 2, 1973

[54] DUAL-USE OPTICAL PROJECTION APPARATUS

[75] Inventor: Kozo Yamamoto, Hirakata, Japan

[73] Assignee: Matsushita Electric Industrial Co., Ltd., Osaka, Japan

[22] Filed: Feb. 1, 1971

[21] Appl. No.: 111,227

[52] U.S. Cl. .................................... 35/9 E, 353/88
[51] Int. Cl. ............................................ G09b 3/06
[58] Field of Search ............... 35/9 E, 9 F; 353/88

[56] References Cited

UNITED STATES PATENTS

| 3,120,708 | 2/1964 | Silber | 35/9 E |
| 3,095,654 | 7/1963 | Cummings | 35/9 E UX |
| 3,412,480 | 11/1968 | Connell | 35/9 E |

*Primary Examiner*—Wm. H. Grieb
*Attorney*—Stevens, Davis, Miller & Mosher

[57] ABSTRACT

A dual-use optical projection apparatus having movable dousers or light-intercepting plates inserted between a screen on which an image on the film in an optical system is projected and the film itself, and a control system for moving the light-intercepting plates between a position where part of the image on the film is prevented from being projected on the screen and another position where the whole image is projected on the screen, whereby the projector is usable both as educational equipment combined with a film having question and answer sections and an ordinary projector.

10 Claims, 21 Drawing Figures

K. YAMAMOTO
INVENTOR

BY Stevens, Davis, Miller & Mosher
ATTORNEYS

PATENTED JAN 2 1973 3,707,779

DUAL-USE OPTICAL PROJECTION APPARATUS

The present invention relates to a slide projector which can be used both for general purposes and as educational equipment combined with a film having question and answer portions.

There is a conventional projector for educational purposes which is used with a film carrying a question section with a plurality of choices for a correct answer, and in which answers are masked with a shutter and only the question section is projected on part of the screen. After a learner selects one of the choices, the shutter is opened to project the answer on the remaining portion of the screen. Since this device allows only a part of the screen to be usually used, it cannot be applicable to a film other than those with question and answer sections, and if applied to an ordinary film, a projected image juts out of the defined section. On the other hand, if only part of the screen is used, the image is necessarily reduced in size to the inconvenience of the learner. For this reason, there is no equipment which can be used both for educational and general purposes.

An object of the present invention is to provide a projector which can be used not only with an educational film having a question section with a plurality of choices and an answer section, but also for general purposes by switching the device by means of a simple mechanism so that the whole screen can be used.

The projector according to the present invention comprises a light source, a screen on which images on the film are projected by the light source, a film-loading device disposed between the light source and the screen, a masking device between the screen and the film-loading device and with a plurality of mask plates each movable independently between a masked position at which a part of the image on the film is masked and an unmasked position at which the whole image can be projected, and a control device for moving the mask plates or dousers.

The projector according to the present invention can be used both as educational equipment in which a part of the screen usually masked is unmasked as occasion demands, and as an ordinary projector where the screen is usually not masked. In addition, switching between the above two uses can be easily accomplished.

The above and other objects, features and advantages will be made apparent by the detailed description taken in conjunction with the accompanying drawings, in which.

Figure 1:
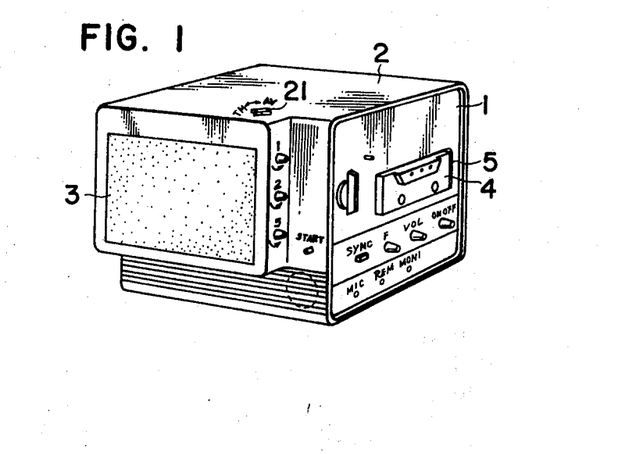
FIG. 1 is a perspective view showing an embodiment of the projector according to the present invention.
Figure 4:
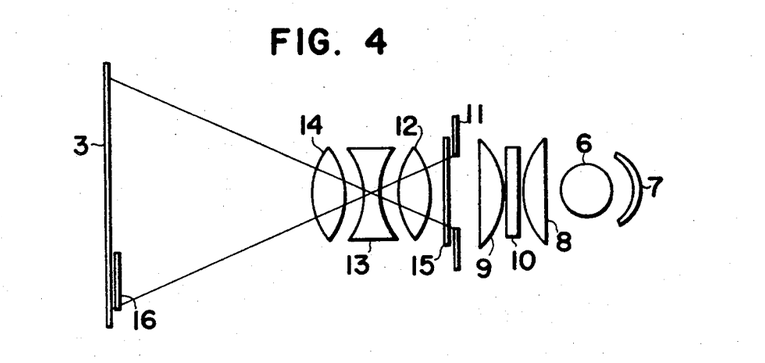
FIG. 4 is a diagram showing the optical system of the projector.

As shown in FIG. 1, the projector according to the present invention has a housing 2 for the device proper which is integrated with a viewing screen on the front. A mount 5 for a tape cassette 4 is provided on the side of the housing 2. An optical system in the device proper 1 consists of, as shown in FIG. 4, a lamp for light source 6, a reflector 7, condenser lenses 8 and 9, a heat absorbing filter 10, an aperture 11, projecting lenses 12, 13 and 14 and a screen 3. The film 15 is inserted between the aperture 11 and the projecting lens 12. In this optical system, images on the film 15 are projected onto the screen 3 on the same principle as in ordinary projectors.

The optical system according to the present invention has a masking device 16 near the screen 3 for preventing, as occasion demands, a part of an image on the film 15 from being projected on the screen 3. This masking device 16 will be explained below with reference to FIGS. 2 and 3.

Figure 2:
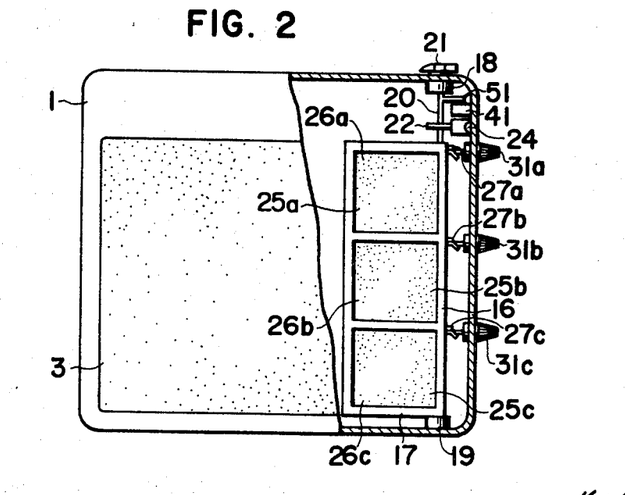
FIG. 2 is a partially sectioned front view showing a part of the screen of the projector.
Figure 3:
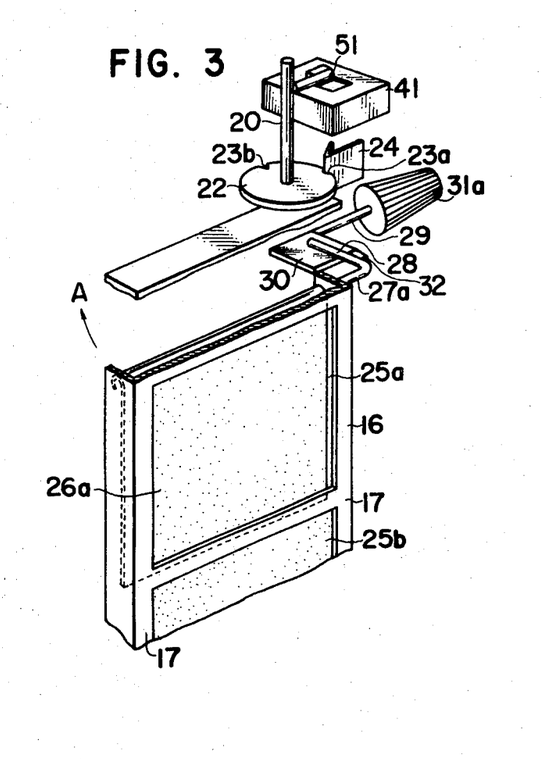
FIG. 3 is a partially exploded view of the masking device according to the invention.

The masking device 16 is disposed near the screen 3 inside the housing 2. In more detail, a rectangular frame 17 is mounted, with one end thereof rotatable, on bearings 18 and 19 of the housing 2 by means of a shaft 20. This shaft 20 is projected above the housing 2 and has a knob 21 at the top. By rotating the knob 21, the frame 17 is rotated either to a first position where the frame is in parallel with the screen 3 to mask the right portion of the screen, or to a second position where the frame is perpendicular to the screen and therefore the screen is unmasked.

The frame 17 is held at the first or second position by a portion of a spring plate 24, which is fixed on the housing 2 and fits into the notches 23a and 23b of the cam 22 rotatable integrally with the shaft 20. Although the cam should override the notch in order to rotate the shaft, the operation is easy, requiring no great force, if the notches 23a and 23b are made shallow.

The frame 17 has three openings 25a, 25b and 25c, upper, middle and lower respectively, which are to be masked by the dousers 26a, 26b and 26c respectively. These dousers are rotatably mounted on the frame 17 at their upper ends inside the openings by means of the shafts 27a, 27b and 27c. The dousers 26a, 26b and 26c are rotated integrally with the shafts 27a, 27b and 27c respectively, and shift between a masked position where they mask the openings 25a, 25b and 25c respectively and an open position where the dousers are perpendicular to the surface of the screen 3 and the openings 25a, 25b and 25c are not masked.

The rotational motion of the shafts 27a, 27b and 27c will be explained with the shaft 27a taken as an example. As shown in FIG. 3, the end of the shaft 27a is bent inside, and the underside of the bent portion 28 is in contact with the upper surface of a control board 30 integral with the control shaft 29 which is rotatably supported by the side plate of the housing 2. By rotating the knob 31a mounted at the outer end of the control shaft 29 in one direction, the shaft 27 is rotated to swing up the douser 26a, and by rotating the knob in the counter direction, the douser 26a is shut by weight of itself or force of a spring provided thereto.

It is only when the frame 17 is at the first position that the shaft 27a is in contact with the control board 30, and when the frame is at the second position, the bent portion 28 of the shaft 27a is detached from the control board 30. When the frame 17 returns to the first position, the shaft 27a again contacts the control board 30, making the douser 26a rotatable. At this time, the opening 25a is masked by the douser 26a with the bent portion 28 of the shaft 27a positioned in the horizontal direction in contact with the upperside of the control board 30.

The control board 30 is provided with a guide slope 32 to ensure a smooth contact of the control board 30 with the bent portion 28 of the shaft 27a.

The control systems for the dousers 26b and 26c are constructed in a similar manner and are operated by the knobs 31b and 31c mounted on the side of the housing 2.

Figure 5:
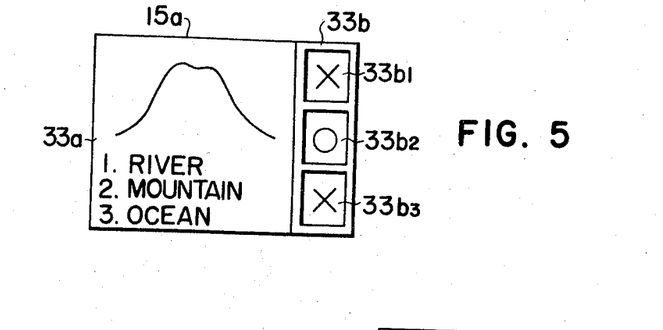
FIGS. 5 and 6 show front views of a film used with the projector.
Figure 6:
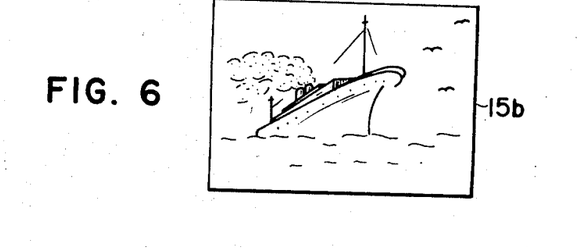

The projector according to the present invention is used with two kinds of films as shown in FIGS. 5 and 6.

The film 15a shown in FIG. 5 is for class use and has a question section 33a and an answer section 33b within an image to be projected on the screen 3. This film is mounted in the projector in such a manner that the question section 33a and the answer section 33b are projected onto the left and right sides of the screen 3 respectively. The answer section 33b, however, is not projected on the screen 3 when the dousers 26a, 26b and 26c are positioned in parallel with the screen 3 and intercept the light.

The answer section 33b is divided into three answers $33b_1$, $33b_2$ and $33b_3$ which correspond to the number of choices in the question section 33a. In actual operations, the frame 17 is preset at the first position, as shown in FIGS. 2 and 3, where the dousers 26a, 26b and 26c respectively mask the openings 25a, 25b and 25c. The film 15a is then mounted on the device proper 1 to project only the question section 33a on the screen 3.

The learner studying the question section selects his own choice and turns the knob 31a, 31b or 31c to rotate the douser 26a, 26b or 26c respectively. For example, if he decides on choice 1 as a correct answer, he rotates the douser 26a with the knob 31a. Then, the answer $33b_1$ of the answer section 33b is projected together with 'correct' or 'wrong' mark indicating whether the answer is correct or not respectively. If the choice $33b_1$ is wrong, the learner again studies the question and decides on another choice and rotates the douser 26b or 26c by means of the knob 31b or 31c corresponding to the choice, thereby to know whether the choice is correct or not. The projector thus combined with the film 15a can be used as educational equipment.

Further, the projector according to the invention can be used, as shown in FIG. 6, with an ordinary film 15b. For this purpose, the frame is rotated together with the dousers 26a, 26b and 26c by means of the knob 21 in the direction of arrow A to the second position where the masking device 16 is positioned perpendicular to the screen 3. Mounting the film 15b on the projector at this position, light is not intercepted by the douser 26a, 26b or 26c and the whole image of the film 15b is projected on the screen 3.

The frame 17 is held at one of the two positions by means of the cam 22 and the spring plate 24, ensuring stable operation of the projector.

A recording-reproducing device using a magnetic tape is incorporated into, and interlocked with, the projector for the purpose of giving a description of the image on the screen 3. (or giving tips for a correct answer in the case of films for class use.) An electrical block diagram of a control circuit for the recording-reproducing device thus built in is shown in FIG. 7, while signals as recorded on the magnetic tape 34 are shown in FIG. 8.

Figure 7:
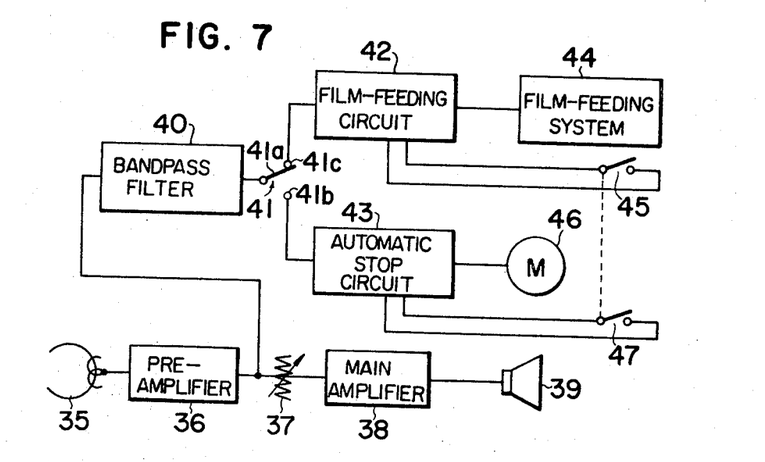
FIG. 7 is an electrical block diagram showing the control circuit of the projector.

Referring to FIG. 7 first, an output of the reproducing head 35 is applied through a preamplifier 36 and a volume control 37 to a main amplifier 38, the output of which actuates the speaker 39. On the other hand, the output of the preamplifier is also applied to a band-pass filter 40, an output of which is applied selectively to a film-feeding circuit 42 or an automatic stop circuit 43 through a selective switch 41. When the film-feeding circuit 42 is connected, the film-feeding system 44 is driven for automatic feeding of the film. The film feeding operation can be performed manually by means of the switch 45.

When the automatic stop circuit 43 is connected, a tape-feeding motor 46 stops. This motor can be restarted by closing a starting switch 47 which is interlocked with the switch 45.

Figure 8:
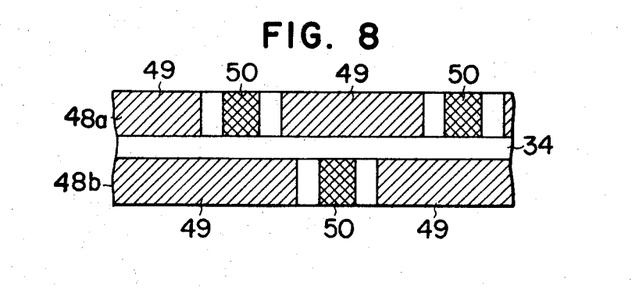
FIG. 8 is a diagram showing an arrangement of signals recorded on the magnetic tape used with the projector.

Referring to FIG. 8, the magnetic tape 34 is divided into two tracks 48a and 48b, on each of which voice signals 49 for the description of the image on the screen and film-feeding signals 50 which greatly differ in frequency from the voice signals 49 are recorded alternately.

The selective switch 41 is controlled, as shown in FIGS. 2 and 3, with a control protrusion 51 which rotates integrally with the shaft 20 for controlling the rotation of the frame 17. When the frame 17 is at the first position, the movable contact 41a of the selective switch 41 is in contact with the fixed contact 41b, whereby an output of the bandpass filter 40 energizes the automatic stop circuit 43. On the other hand, when the frame 17 is at the second position, the movable contact 41a is in contact with the fixed contact 41c, so that an output of the bandpass filter 40 is applied to the film-feeding circuit 42.

According to the embodiments of the invention, the magnetic tape 34 is contained in a tape cassette 4. When the magnetic tape 34 in the tape cassette 4 controls the feeding of the film 15a for educational purposes, a voice signal 49 which may be picked up from the magnetic tape 34 by the reproducing head 35 is amplified by the preamplifier 36 and applied to the main amplifier 38 to be converted into an actual voice by the speaker 39. This voice carries instructions or tips in connection with the question included in the question section 33a projected on the screen. This voice signal is applied from the preamplifier to the bandpass filter 40, which passes only those signals with the same frequency as the film-feeding signal 50. Therefore, the voice signal is not produced as an output of the bandpass filter. The film-feeding signal 50 is detected by the reproducing head 35 and is applied to the automatic stop circuit 43 through the bandpass filter 40 and the movable and fixed contacts 41a and 41b of the selective switch 41. Then, the motor 46 is stopped, halting the feed of the magnetic tape 34. This stopping of the magnetic tape 34 is provided in order to give a pause for the learner to study the question. During this pause, the learner decides on his answer and, after a certain period of time, closes the starting switch 47. Then, the motor 46 is started again to begin the tape feed, while at the same time the switch 45 is closed to energize the film-feeding circuit 42, with the result that the film 15a is switched by the film-feeding system 44 to proceed to the next question.

To use the projector according to the present invention for general purposes, by contrast, the frame 17 is rotated to the second position by means of the knob 21, whereby the movable contact 41a of the switch 41 is brought into contact with the fixed contact 41c. Thus, as the film-feeding signal 50 is detected by the reproducing head 35, the film-feeding circuit 42 is energized and thereby the film 15b is automatically switched by means of the film-feeding system 44.

Incidentally, the voice signal 49 is for producing a voice for explaining the image projected on the screen.

Figure 10:
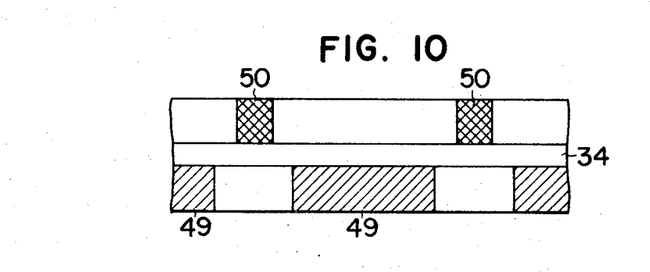
FIG. 10 is a diagram showing an arrangement of signals recorded on the magnetic tape used with the embodiment of FIG. 9.

In the above-mentioned embodiment, both the voice signal 49 and the film-feeding signal 50 are detected by a single reproducing head 35. This may be replaced by a method as shown in FIG. 10 in which the voice signal 49 and the film-feeding signal 50 are recorded on separate tracks of the magnetic tape 34 to be separately picked up by the reproducing heads 35 and 51. In this case, an output of the reproducing head 51 for detecting the film-feeding signal 50 is applied to the preamplifier 52, while the output of the preamplifier 52, like that of the bandpass filter 40 in the above-described embodiment, is controlled by the switch 41. The same effect is obtained by this device as with the above-mentioned embodiment.

The screen 3 which is integrated with the device proper in the above-described embodiments may be provided separate from the device proper without affecting the functions of the projector.

The number of answers in the answer section of the film 15a for class use and corresponding dousers 26a, 26b and 26c are not limited to three, but may be decreased or increased as required.

Further, the functions of the projector according to the present invention are not substantially affected even if the masking device 16 is disposed on the outside of the screen 3.

Figure 11:
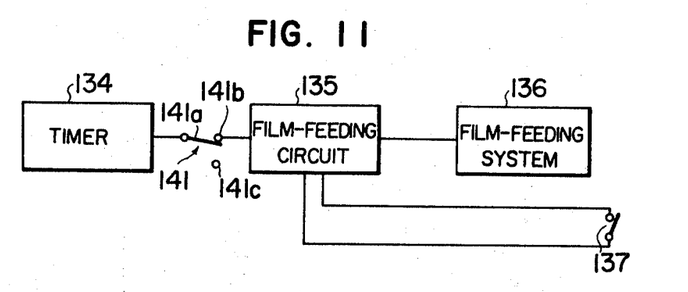
FIG. 11 is an electrical block diagram showing a control circuit of another embodiment of the invention.

In another embodiment of the invention, the film feed can be automatically controlled for general use other than class use. A block diagram of a control circuit for that purpose is shown in FIG. 11. The film 3 is fed by means of an output signal of the timer 134 in such a manner that this signal is applied through the switch 141 to the film-feeding circuit 135, which is energized to actuate the film-feeding system 136 to feed the film 15. The output side of the timer 134 is connected with the movable contact 141a. This movable contact switches to the fixed contact 141b and the output of the timer 134 is applied to the film-feeding circuit 135 when the dousers 26a, 26b and 26c are positioned perpendicular to the screen 3. On the other hand, when the dousers are in parallel with the screen 3, the movable contact 141a is switched to the fixed contact 141c so that no output of the timer 134 is applied to the film-feeding circuit 135.

Thus, in the case where the projector according to the invention is used for general purposes without intercepting any light to project the whole image on the screen 3, the image is continuously described by means of the tape cassette mounted in the device proper 1, while the film 15 is automatically fed with output signals supplied at regular intervals by the timer 134. On the other hand, in the case where the projector is used as educational equipment with the dousers 26a, 26b and 26c positioned in parallel to the screen 3 to prevent a part of the image from being projected on the screen 3, the timer 134 is disconnected by means of the switch 141 and so the timer 134 plays no role in the feeding of film 15. In this case, the film 15 is fed at will by means of the switch 137 connected with the film-feeding circuit 135, so that the learner is given as much time as he desires to work on the question and decide on his answer.

Figure 12:
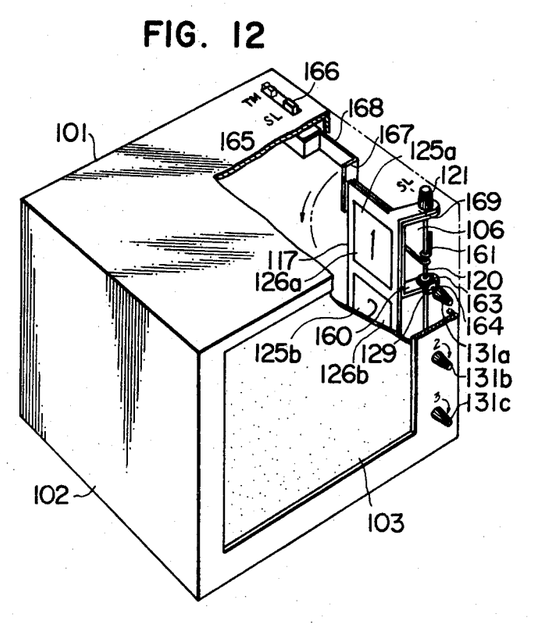
FIGS. 12 and 13 are partially exploded perspective views showing a masking device of another embodiment of the invention.
Figure 13:
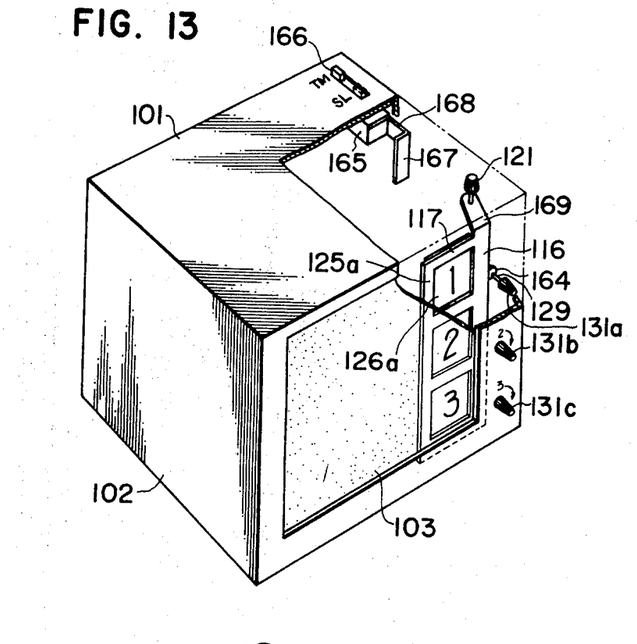
Figure 14:
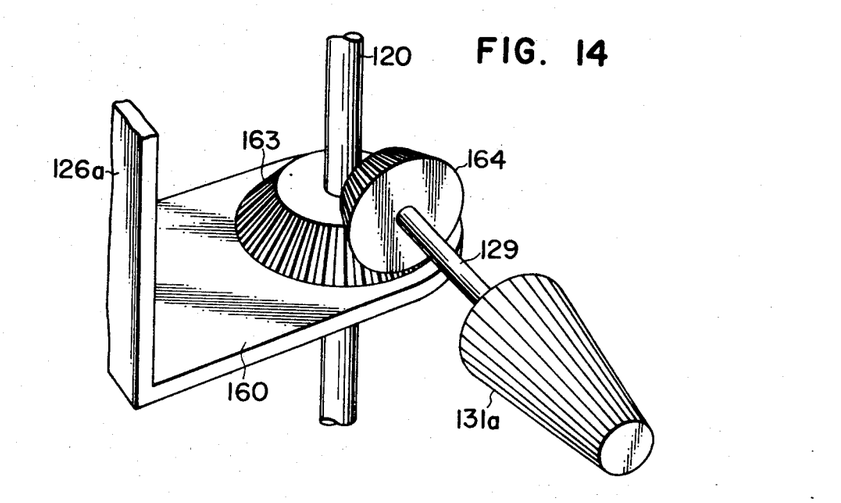
FIG. 14 is a perspective view showing in close-up the control means for the dousers.

Another embodiment of the masking device will be explained below with reference to FIGS. 12, 13 and 14. As shown in FIGS. 12 and 13, the screen 103 is provided on the front of the housing 102 of the device proper 101, and a mount for a tape cassette (not shown in the drawings) is located on the back thereof. The optical system contained in the device proper 101 is similar to the one used with an ordinary projector and therefore is not shown in the drawings. A masking device 116 is provided on the back of the screen 103 to mask the right portion of the screen 103 as desired. This masking device comprises a shaft 120 which is rotatively mounted on the housing 102 and a frame 117 with openings 125a, 125b and 125c (the last being not shown) which, fixed on the shaft 120 by means of the arms 169, rotates integrally with the shaft 120 by turning the knob 121 provided on a protrusion at the top of the housing 102. In this way, the frame 117 can be switched between the first position where it is parallel with the screen 103 and the second position where it is perpendicular to the screen 103.

Dousers 126a, 126b and 126c (the last being not shown) are rotatively mounted on the shaft 120 by means of the arms 160, each douser consisting of a magnetic material including a dark iron plate and marked with white numerals 1, 2 and 3 respectively.

Description will be made below with the douser 126a taken as an example, because all the dousers 126a, 126b and 126c are of similar constructions. The douser 126a is usually kept pressed against the back of the frame 117 to mask the opening 125a, by means of the spring 161 which is engaged with the back of the douser 126a at an end and engaged with the inner surface of the housing 102 at the other. This spring 161 also acts to press the frame 117 against the inner surface of the screen 103. The douser 126a has a bevel gear 163 integral with the arm 160 which rotates with the shaft 120 as an axis, and this bevel gear 163 meshed with a bevel gear 164 which is mounted on the shaft 129 with its end projected through the front of the housing 102. Therefore, by rotating the knob 131a on the shaft 129, the douser 126a rotates around the shaft 120, so that the douser 126a can be controlled to open the opening 125a of the frame 117 against the spring 161. This is also the case with the dousers 126b and 126c which has knobs 131b and 131c on the front of the housing 102 to open the openings 125b and 125c respectively.

Figure 9:
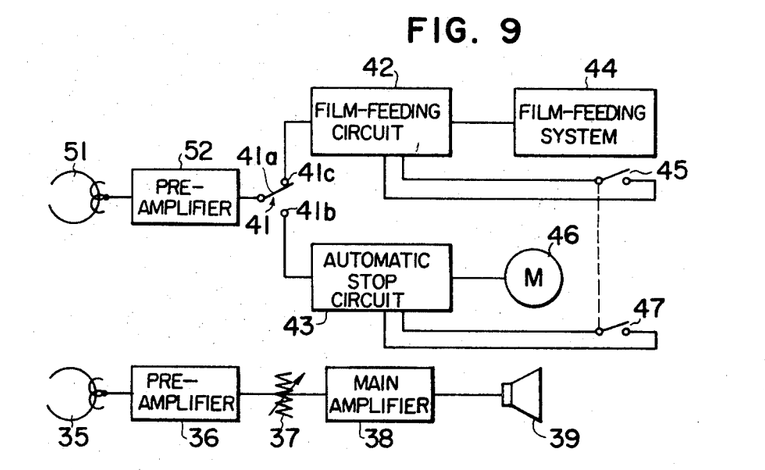
FIG. 9 is a block diagram showing an electrical circuit of another embodiment of the present invention.

The housing 102 has on the inner surface of its upperside a switch 165 to switch the projector between automatic and manual feeds of the film through signals recorded on the magnetic tape. This switch, which corresponds to the selective switch 41 as shown in FIGS. 7 and 9 or the switch 141 as shown in FIG. 11, are switched to automatic or manual feed of the film by closing the control key 166 on the side SL or TM respectively. The operation of the control key 166 is synchronized with the forward and backward motion of the slide plate 168 with a magnet 167 on its end. This magnet 167 attracts part of the frame 117 to hold it immovable when the control key 106 of the switch 165 is closed on the SL side at the second position of the frame 117 as shown in FIG. 12. By contrast, switching the key 106 to the TM side causes the frame 117 to be released from the magnet 167 and pulled back to the first position by means of the spring 161.

Figures 15, 16, 17:
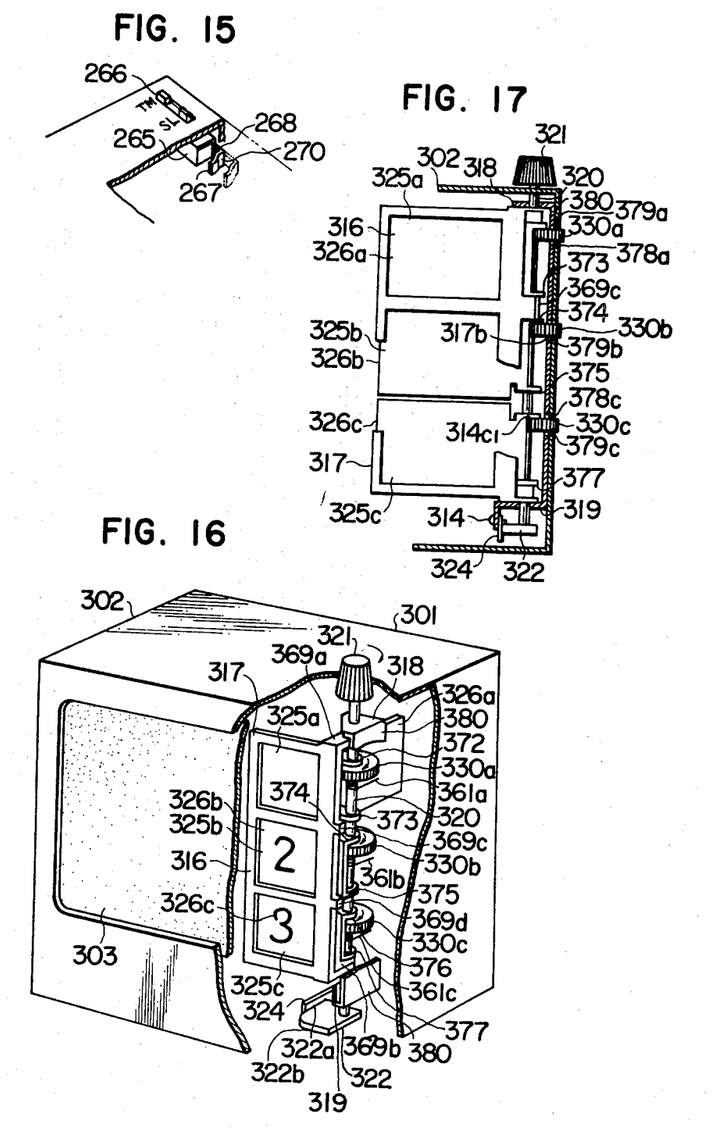
FIG. 15 is a diagram showing a part of a supporting means for the masking device according to another embodiment.
FIGS. 16, 17 and 18 are diagrams showing a masking device according to another embodiment of the invention.

FIG. 15 shows a modification of the frame-holding device as shown in FIG. 13, and the film is switched between automatic and manual feeds by closing the control key 266 of the switch 265 to the sides of SL and TM respectively. The operation of the control key 266 is synchronized with a holding plate 268 consisting of a spring plate or the like with a bent portion 267. The bent portion 267 of the holding plate 268 has an inwardly curved portion 270 at its center, into which part of the frame is fitted to hold it immovable when the control key 266 of the switch 265 is closed on the SL side at the second position of the frame.

Figures 18, 19:
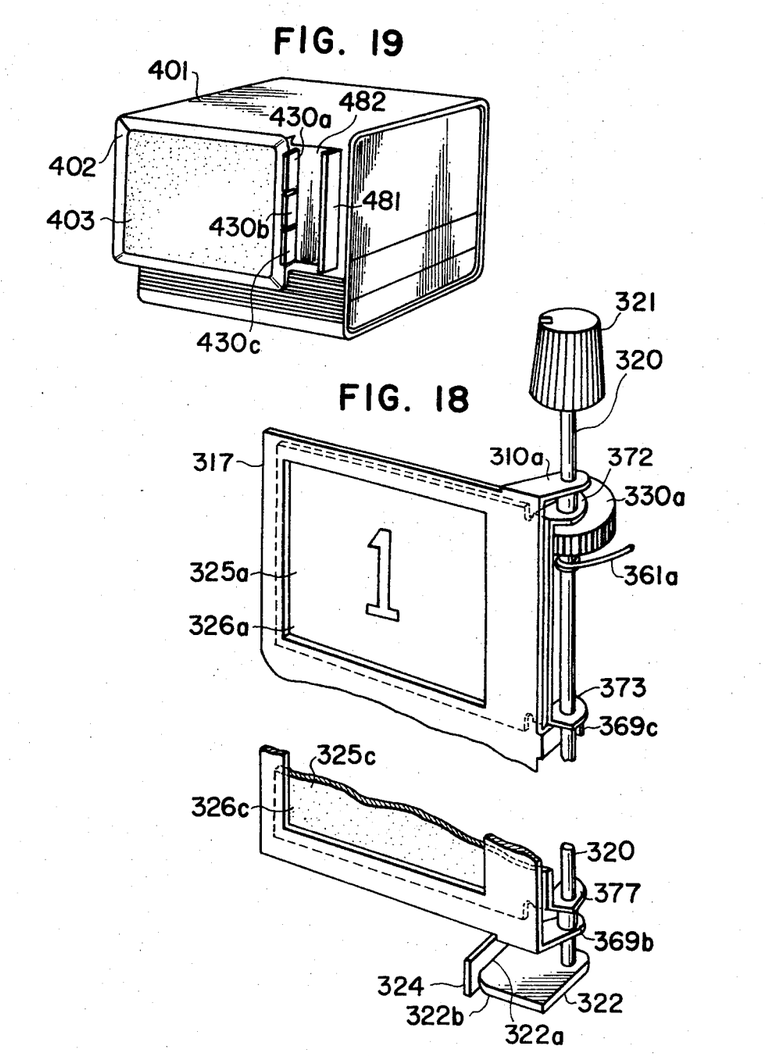
FIGS. 19 and 20 are diagrams showing a masking device according to still another embodiment of the present invention.

The masking device may be alternatively constructed in the manner as shown in FIGS. 16, 17 and 18.

Referring first to FIG. 16, a projector means (not shown) and a screen 303 are provided within and on the front of the housing 302 of the projector proper 301 respectively. A masking device 316 is provided on the angle 380 mounted on the inner wall 302a of the housing 302 behind the screen 303. The masking device 316 is constructed as follows: Bent portions 318 and 319 formed at the top and bottom of the angle 380 support the control shaft 320 rotatably which projects through the ceiling of the housing 302. The frame 317 with three openings 325a, 325b and 325c are mounted on the shaft 320 by the agency of the bent portions 369a and 369b so as to rotate integrally with the shaft 320. This rotation is performed by means of the knob 321 at the top of the shaft 320 projected above the ceiling of the housing 302, thereby making it possible to switch the frame 317 between the first position where the right portion of the screen 303 is masked and the second position where the frame 317 is on the inner wall 302a of the housing 302.

The control shaft 320 has a cam 322 at its lower end which has an arc-shaped corner and two vertical sides 322a and 322b extended from that corner. A spring plate 324 which is selectively pressed against the side 322a or 322b of the cam 322 is fixed on the bottom of the angle 380 with a screw 371. When the spring plate 324 is pressed against the side 322a of the cam 322 as shown in FIGS. 16 and 18, the frame 317 is positioned parallel with the screen 303. On the other hand, when the control shaft 320 is rotated with the knob 321 in the direction of the arrow shown in FIG. 16, the spring plate 324, after riding the arc of the cam 322, is pressed against the side 322b where the frame 317 is held in position by means of the spring plate 324 in parallel with the inner wall 302a of the housing 302. Dousers 325a, 325b and 325c with protrusions 372, 373, 374, 375, 376 and 377 rotatably fitted into the control shaft 320 and each capable of independently masking the openings 325a, 325b and 325c respectively are provided between the bent portions 369a and 369b and protrusions 369c and 369d formed on the frame 317. The dousers 326a, 326b and 326c are usually pressed against the inner surface of the frame 317 at both ends to close the openings 325a, 325b and 325c, by means of the springs 361a, 361b and 361c which are engaged with the inner surface of the dousers 326a, 326b and 326c at one end and with the inner wall surface 302a of the housing 302 at the other.

The protrusions 372, 374 and 376 of the dousers 326a, 326b and 326c are integrated with the control discs 330a, 330b and 330c respectively, and each disc has a part exposed outside through the slots 378a, 378b or 378c on the angle 380 and slots 379a, 379b and 379c on the side plate of the housing 302 respectively. By rotating these control discs, the dousers 326a, 326b and 326c are rotated in the direction of the arrow against the springs 361a, 361b and 361c respectively thereby to unmask the openings 325a, 325b and 325c of the frame 317.

Figure 20:
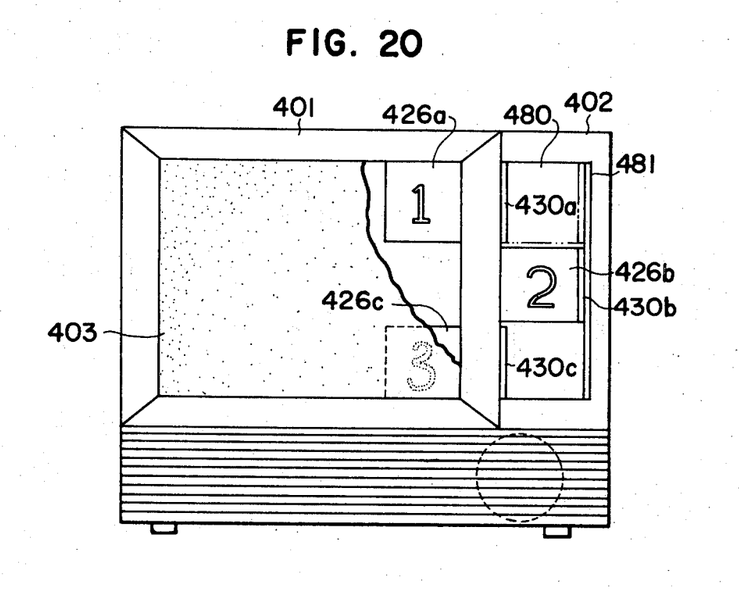
Figure 21:
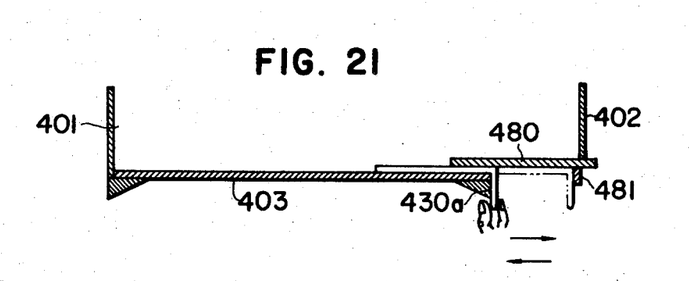
FIG. 21 is a sectional view showing the construction of the masking device of FIG. 19.

An embodiment of the invention without any frames in the masking device will be explained below with reference to FIGS. 19, 20 and 21.

A projector as shown in FIG. 19 has a projecting system (not shown) inside of and a screen 403 on the front of, the housing 402 of the device proper 401, both being integrated with the housing. Upper, middle and lower dousers 426a, 426b and 426c which are to mask the right side of the screen 403 are mounted slidably on the guide wall 482 on the back of screen 403 on the right front side of the housing 402. The dousers 426a, 426b and 426c have handles 430a, 430b and 430c respectively, and a projection 481 is provided on the front of the housing to hold in position the dousers 426a, 426b and 426c when they are pulled out with the handles 430a, 430b and 430c. The dousers 426a, 426b and 426c are prevented from masking the screen 403 when the handles 430a, 430b and 430c are pulled out to make contact with the projection 481.

What is claimed is:

1. An optical projection apparatus comprising a light source; a screen disposed in a path of light from said light source for projecting thereon an image of a film; film-loading means for releasabily mounting a film between said light source and said screen in said light path; light-intercepting means for screening a predetermined part of said image projected on said screen and including a plurality of light-intercepting plates for screening a plurality of predetermined sections of said part of said image, respectively, each of said light-intercepting plates being independently movable between a light-intercepting position defined between said screen and said light source in said light path for screening a corresponding one of said sections and a non-intercepting position defined outside said light path for preventing said corresponding section from being screened; control means for controlling the movement of said light-intercepting plates; and holding means for holding all of said light-intercepting plates at their non-intercepting positions for permitting said image to be completely projected on said screen.

2. An optical projection apparatus according to claim 1, in which said light-intercepting means comprises a frame on which said light-intercepting plates are movable mounted, said frame being movable between a first position where said light-intercepting plates are movable and a second position where said light-intercepting plates are incapable of preventing said sections of said image on the film from being projected on the screen.

3. An optical projection apparatus according to claim 2, comprising a means for holding said frame at the first and second positions.

4. An optical projection apparatus according to claim 2, comprising a magnetic tape recording-and-reproducing means for describing the image projected on said screen; said magnetic tape recording-and-reproducing means including a film-feeding signal detector circuit which detects film-feeding signals recorded on the magnetic tape together with signals for describing the image and produces an output, and an automatic stop circuit which not only automatically stops the feed of the magnetic tape when an output signal of said film-feeding signal detector circuit is applied to said automatic stop circuit, but also has a manual feeding circuit for restarting the tape feed as desired; said film-loading means comprising a film-feeding means for feeding the film in sequence, a film-feeding circuit which not only drives said film-feeding means when an output signal of said film-feeding signal detector circuit is applied to said film-feeding circuit, but also has a manual control circuit interlocked with said manual feeding circuit to operate said film-feeding means manually, and a frame position detector circuit including a first switch inserted between said film-feeding signal detector circuit and said automatic stop circuit and a second switch inserted between said film-feeding signal detector circuit and said film-feeding circuit, said first and second switches being adapted to close and open respectively at said first frame position and to open and close respectively at said second frame position.

5. An optical projection apparatus according to claim 4, in which said light-intercepting means includes a frame-holding means which operates in concert with the movement of said frame to the second position.

6. An optical projection apparatus according to claim 2, in which said film-loading means comprises a film-feeding means for feeding the film in sequence, a film-feeding circuit for driving said film-feeding means, a signal circuit for generating a signal for energizing said film-feeding circuit, and a frame position detector circuit inserted between said film-feeding circuit and said signal circuit, said frame position detector circuit having a contact which detects the position of said frame and closes at the second frame position, said film-feeding circuit including a manual control circuit for energizing said film-feeding circuit manually as desired.

7. An optical projection apparatus according to claim 2, in which said frame is supported on one shaft so as to be rotatable between said first position where said frame is in parallel with said screen and said second position where said frame is at right angles or more to the screen, said frame including a plurality of openings corresponding to said light-intercepting plates each independently movable between a light-intercepting position where a corresponding one of said openings is closed and a non-light-intercepting position where a corresponding one of said openings is opened, said light-intercepting plates being usually held at the light-intercepting position by a unidirectional force, said light-intercepting plates being interlocked with a control board for moving said light-intercepting plates to the non-light-intercepting position against said unidirectional force when said frame is at the first position.

8. An optical projection apparatus according to claim 7, in which each of said light-intercepting plates is movable between a non-light-intercepting position where said light-intercepting plate is released from a corresponding opening by a rotating shaft provided on one side of said opening and a light-intercepting position where said light-intercepting plate is returned to the opening by the rotating shaft, said light-intercepting plates being usually held at the light-intercepting position by said unidirectional force, said control board having an engaging member which engages with said winding shaft to enable rotation of said light-intercepting plate against said unidirectional force only at the first position of said frame.

9. An optical projection apparatus according to claim 7, in which each of said light-intercepting plates is supported coaxially with a rotary shaft of said frame so as to be independently rotatable between the light-intercepting position and the non-light-intercepting position, said light-intercepting plates being usually held at the light-intercepting position by means of a spring, said control board being integrated with said light-intercepting plates.

10. An optical projection apparatus according to claim 1, in which each of said light-intercepting plates is marked with a character, numeral or a symbol on the front of the same so as to be visible through said screen when said light-intercepting plate is positioned at the light-intercepting position.

* * * * *